United States Patent Office 3,598,562
Patented Aug. 10, 1971

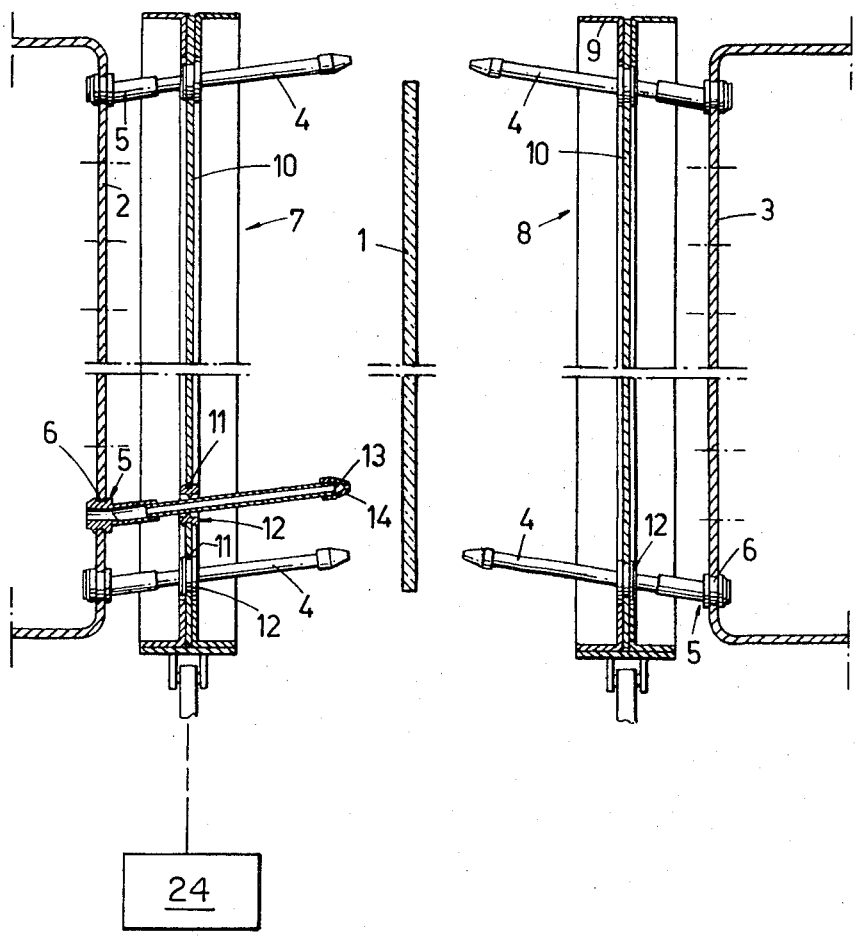

3,598,562
APPARATUS FOR TEMPERING FLAT GLASS
Guy Angely, Brussels, Belgium, assignor to
Cobelcomex, Brussels, Belgium
Filed Jan. 8, 1968, Ser. No. 696,288
Claims priority, application Belgium, Jan. 9, 1967,
38,242; Patent 692,332
Int. Cl. C03b 27/00
U.S. Cl. 65—348
2 Claims

ABSTRACT OF THE DISCLOSURE

Apparatus for tempering flat glass having a specific number of nozzles provided on either side of the flat glass and issuing thereon cold air blasts in order to effect the tempering. Two movable frames are arranged on either side of the flat glass to be tempered, each frame carrying a specific number of blowing nozzles intermediate the length of the nozzle by means of an elastic connection. Each nozzle is connected to a plenum chamber by means of an elastic pivotal connection whereby the free end of these nozzles can decribe a curve so that the compressed cooling air strikes the glass according to a corresponding path of this curve.

---

The present invention relates to improvements in tempering flat glass.

As is known, tempering glass comprises two distinct operations: first the glass is heated to a pre-determined temperature, then it is very rapidly cooled to a temperature below the lower tempering point.

This invention relates to the cooling operation.

This cooling is currently carried out, by means of compressed air blasts, to insure a uniform tempering of the glass.

Such blasts usually issue from a series of nozzles provided on either side of the flat glass and rigidly mounted on a movable chamber which supplies these nozzles with compressed air. In order to insure the highest possible homogeneity of the tempering of the glass the chamber is provided with an appropriate movement in order that each air blast issuing from a nozzle does not continually strike the glass at the same point.

It is known that the tempering is more uniform, the faster the movement of the nozzles.

However, in the known flat glass tempering apparatus, the nozzles are mounted on one or more movable chambers, which by themselves and together with their accessories and their running mechanisms are very heavy. Accordingly the permitted movement is fairly slow, to the disadvantage of the homogeneity of the tempering. Moreover, the power needed to control the movement is considerable.

It is therefore of particular interest to provide, as has been done according to the invention, apparatus for tempering flat glass, which is of light weight so as to allow a faster movement of the nozzles and thus to achieve a more uniform tempering.

By speeding up the motion of the nozzles, a better distribution of the temper in the glass and a better equilibrium of the internal stresses are achieved.

According to the invention, a plant for tempering flat glass is provided, comprising two movable frames to be arranged on either side of the flat glass to be tempered, each frame carrying a specific number of blowing nozzles by means of an elastic connection, each nozzle being connected by one end to a stationary chamber supplying cold compressed air, also by means of an elastic connection, while the other end of the nozzle is directed towards the flat glass, so that, the nozzle may pivot and the free end of these nozzles describes a curve of compressed cooling air which strikes the glass according to the path corresponding to this curve.

According to one embodiment, the nozzles are mounted in their respective frame by means of an elastic connection at an intermediate point of their length, the curve described, by the end of each nozzle for a movement of specific amplitude of the frame, being the greater or the smaller, relative to the length of the portion of the nozzle between the free end thereof and the frame, The frames carrying the nozzles and arranged on either side of the flat glass may be provided with movements in phase or out of phase.

Other details and features of the invention will become apparent from the description given hereinafter by way of non limiting example and with reference to the accompanying drawing.

The drawing represents partially in section and in elevation, the portion of a glass tempering apparatus, comprising the new characteristics of the invention.

The flat glass to be tempered is designated by the reference 1. It is a sheet of glass previously heated and positioned in a known manner between two chambers 2 and 3 which, contrary to what exists in the prior art are stationary.

These chambers are cold compressed air supply sources for dispersion on the glass 1 through blowing nozzles 4. They are mounted on the chambers by means of connections 6 provided by elastic sleeves, for example of rubber of suitable quality.

It should be noted that the base of a nozzle 4, which may be considered as comprised of the connecting point 6 of the sleeve 5 with the chamber 2 or 3 is stationary.

The movement of the nozzles is caused by a movable frame 7 or 8. Each frame comprises for example, a framing 9 made up from angles and a sheet 10. The nozzles are made integral with the frame so that the movement thereof impels the outlet end of the nozzles to describe a curve such that the cold air issuing from these nozzles strikes the flat glass according to a specific area. The movement can be imparted by any well known mechanical means, 24 to impart a circular movement to the frame 9.

The nozzle may therefore be made integral with their frame at any point along their length. However, as shown on the drawing, the nozzles will preferably pass through their frame at an intermediate point 11 of their length, with the provision of a connection 12 comprising a ring of elastic material, for example of rubber.

The movement imparted to the frames can be of any kind.

If the frames are provided with two equal sine wave motions offset by $\pi/2$, a circular movement will be obtained, i.e., as the point 6 of the connection of the nozzles to the frames is considered as stationary, the nozzles will described a cone, and the free end 13, provided with a mouth piece 14, of these nozzles will describe a circle, the diameter thereof being the greater for a given amplitude of the frame motion, the farther that end 13 of the nozzles is distant from the point 11 where the nozzles pass through their frame.

The air blast issuing from the nozzles 4 will therefore strike the flat glass according to a specific area with the diameter or external dimensions corresponding to the movement described by the free ends of these nozzles.

Depending on the arrangement of the nozzles and more particularly depending on the spacing thereof and the amplitude of the movement described by their free end, the areas exposed to the cold air shall overlap, so that maximum homogeneity of the glass tempering will be achieved.

The movement of the two frames, can be in or out of phase so that the areas of cold air established on the glass by means of both sets of nozzles will correspond if in phase.

As only the frames must be provided with a motion and no longer the entire assembly of the chambers and the mechanisms connected therewith, as in the prior art, the speed of the motion may be definitely increased to the advantage of the tempering homogeneity. Moreover, the power needed will be definitely less.

The motion of the frames can be of fairly low amplitude if desired since the curve described by the free end of the nozzles will be the greater the higher the distance between the end and the frame.

It should be understood that the invention is not limited to the details given, many modifications being possible without departing from the scope of the invention. Thus, although the nozzles are shown as passing through the frames thereof at an intermediate point along the length thereof, it must be considered that the essential characteristics of the invention consists in the fact that these nozzles are provided with a suitable motion by being made integral, with a frame imparting the desired motion thereto.

I claim:

1. Apparatus for tempering glass sheets comprising a pair of opposite stationary chamber means for supplying cold compressed air; a plurality of individual tubes projecting in the direction of the plane of the glass sheets; elastic pivotal connection means at one end of each tube having a rubber-like resiliency connecting the tubes and their respective chambers; an integral nozzle at the other end of each tube; frame means connected to each tube intermediate the nozzle and the elastic connection means including an elastic fitting of rubber-like resiliency connecting the frame means with each tube and means for providing motion to each frame such that the individual tubes pivot about the elastic pivotal connection means and the cold compressed air blown from the chamber means through each tube strikes the glass sheet in a curved path.

2. Apparatus for tempering glass sheets as in claim 1 where the elastic pivotal connection means at the end of each tube includes a rubber sleeve connected to each tube.

References Cited

UNITED STATES PATENTS

| | | | |
|---|---|---|---|
| 3,024,572 | 3/1962 | Richardson | 65—348 |
| 3,449,102 | 6/1969 | Nedelec et al. | 65—348X |
| 3,454,388 | 7/1969 | Ritter | 65—348 |

S. LEON BASHORE, Primary Examiner

J. B. HARDAWAY, Assistant Examiner

U.S. Cl. X.R.

65—114, 351